(12) United States Patent
Hyser

(10) Patent No.: US 7,398,390 B2
(45) Date of Patent: Jul. 8, 2008

(54) METHOD AND SYSTEM FOR SECURING A COMPUTER SYSTEM

(75) Inventor: Chris D. Hyser, Victor, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 757 days.

(21) Appl. No.: 10/638,007

(22) Filed: Aug. 8, 2003

(65) Prior Publication Data

US 2005/0033978 A1 Feb. 10, 2005

(51) Int. Cl.
*G06F 21/00* (2006.01)

(52) U.S. Cl. .................... 713/165; 713/166; 713/167; 726/26

(58) Field of Classification Search .............. 726/2, 726/16, 26, 30, 17, 34, 22; 713/193, 163–167, 713/189; 711/145, 100, 152, 163; 710/19, 710/22, 28, 39, 40, 244
See application file for complete search history.

(56) References Cited

U.S. PATENT DOCUMENTS

| | | | | | |
|---|---|---|---|---|---|
| 4,177,510 | A | * | 12/1979 | Appell et al. | 711/163 |
| 4,890,223 | A | * | 12/1989 | Cruess et al. | 711/207 |
| 5,596,739 | A | * | 1/1997 | Kane et al. | 711/152 |
| 5,784,615 | A | * | 7/1998 | Lipe et al. | 719/324 |
| 6,128,728 | A | * | 10/2000 | Dowling | 712/228 |
| 6,868,471 | B1 | * | 3/2005 | Kota | 711/2 |
| 6,952,778 | B1 | * | 10/2005 | Snyder | 726/4 |
| 7,073,059 | B2 | * | 7/2006 | Worely et al. | 713/168 |
| 7,210,043 | B2 | * | 4/2007 | Miyazaki et al. | 713/193 |
| 2003/0200453 | A1 | * | 10/2003 | Foster et al. | 713/200 |

\* cited by examiner

*Primary Examiner*—Gilberto Barron, Jr.
*Assistant Examiner*—Nirav Patel

(57) ABSTRACT

Security-state-reporting and data-control functionality introduced into a computer system to monitor and report the security state of the computer system and to store and make selectively available, for processes executing within a computer system, security-state-associated data. The hardware element includes two control registers, a current-security-state control register ("CSS") and a current-data-bank control register ("CDB"). When the CSS is read, the CSS reports the current security state of the computer system, with security states represented as unsigned integers starting from a highest security level of 0 and decreasing with unsigned integers of increasing magnitudes. The CDB controls access to one or more data-register banks, positioning a data-register window to allow access only to those data-register-bank registers associated with the currently reported security state.

19 Claims, 12 Drawing Sheets

US 7,398,390 B2

METHOD AND SYSTEM FOR SECURING A COMPUTER SYSTEM

TECHNICAL FIELD

The present invention relates to secure computing and, in particular, to a hardware element that may be added to a computer system to prevent exposing secured data and launching programs that carry out sensitive tasks or that access or expose secured data in an insecure computer system.

BACKGROUND OF THE INVENTION

The present invention is related to computer-system security. A large effort is currently underway in the computing industry to provide secure computer systems to facilitate electronic commerce, storage of confidential information in commercial and governmental institutions, secure communications, and for facilitating construction of highly available, tamper-proof computer systems. FIG. 1 is a block diagram of a number of important components within a single-processor computer-hardware platform. The hardware platform 101 includes a processor 103, random-access memory 105, and non-volatile data storage, such as a hard disk drive 107. The processor stores and retrieves data from memory 105 via a high-speed system bus 109. The high-speed system bus is interconnected to one or more lower-speed peripheral busses 111 via a system controller 113. A non-volatile data-storage controller 115 is connected to the peripheral bus 111 as well as to an input/output ("I/O") bus 117 which is connected to the non-volatile data-storage device 107. Additional I/O controllers, such as I/O controller 119, maybe connected to the one or more peripheral busses 111.

During operation, computer programs migrate from the mass-storage device or devices 107 to system memory 105, from where they are executed by the processor 103. Computer programs may also be received by an I/O controller from external devices and moved to system memory 105, from where they are executed by the processor 103. Initially, following power on of the computer system, the processor 103 may begin to execute instructions for a boot program stored in a small, non-volatile memory, such as a flash memory or other read-only memory constituting one or more integrated circuits. The manufacturer of a computer system may use various security techniques, such as digital signatures or other cryptography techniques, to ensure that only trusted, verified boot programs are executed by the processor. At a certain point during the boot process, the small boot program stored within a read-only memory device must begin to verify and then execute larger programs stored on one or more mass-storage devices, such as mass-storage device 107. Again, various security techniques, including cryptography techniques, can be used to continue a chain of trust by which each next-to-be-executed program is first verified by programs already loaded and executed. By this means, the computer system can be brought to life, in stages, following power-on or reset, in a secure fashion.

FIG. 2 is a flow-control diagram that illustrates a fundamental problem in secure computing. Following power on or reset, as described above, the computer system reads a trusted boot program from a read-only memory device and executes that trusted boot program in the initial stages of the boot process in step 202. Next, in step 204, the initially loaded boot program begins to control the hardware system to locate and move other trusted programs from one or more mass-storage devices into system memory for execution. As discussed above, this process may be continued to slowly build up a constellation of core executable programs necessary for operation of the computer system. Finally, a secure kernel may be fully loaded, following which one or more operating systems are loaded and launched, resulting in a useable, fully functioning computer system, with the secure kernel providing a secure interface through which one or more operating systems access system resources. In general, the operating system needs also to be secure, although an operating system may not need to be computationally verified, as necessary for secure kernels.

Although the above-described secure boot process is generally undertaken to bring the system to a fully functional and secure state, there are situations when it is desirable to launch programs that are not secure. For example, a system administrator may desire to boot the system up to a minimal level of functionality, and to then run a suite of diagnostics or administrative tools that are not secure, and then reboot the system. However, the ability to run unsecured programs necessitates that secure programs be provided insecure-state-sensing or insecure-state-sensing-and-disabling mechanisms, so that, for example, a secure boot is not continued or launched following execution of unsecured programs or routines. Otherwise, the carefully constructed chain of trust established by secure boot procedures may be thwarted.

Returning to FIG. 2, at some point during system initialization, an administrator may choose to load and execute untrusted, or, in other words, non-verified software programs, as shown in step 206. The system administrator should then perform a hard reset and reboot the system. However, a secure computer system cannot depend on human users to properly execute security procedures, because human users can easily forget to do so. Assuming that the system is not reset and rebooted following running of untrusted software, in step 206, then later, as shown in step 208, a secure boot program, operating system, or other secure program may be invoked or continued, but should not carry out operations that would expose secure data or invoke secure routines when the computer system is currently insecure. In certain sophisticated systems, rather than a binary differential between an absolutely secure state and an insecure state, a computer system may reside in a number of states associated with increasing security levels, from as insecure state through various partially secure states up to a secure state. For example, a system that has booted a third-party operating system may not be absolutely secure, but may be more secure than a system that has run one or more third-party application programs, or that has exchanged data with external devices via a communications medium. Should the program, in step 208, be constructed to employ security-state-sensing-and-disabling mechanisms, when the program undertakes some secure action, such as storing encryption keys, the security-state-sensing-and-disabling mechanisms may detect and prevent continued execution or operations that would result in compromising secure data. Additional software programs may run, as shown in step 210. Somewhat later, the same program that ran in step 208, or another, similar program, may run, in step 212, and may need to again be protected from carrying out operations that could compromise or expose secure data, or subsequent secure operation of the computer system. For example, the computer program running in step 212 may need to retrieve stored encryption keys, without fear that, by doing so, the program may expose the encryption keys to eavesdropping software agents or other malicious, untrusted processes running within the computer system. In general, the security state may only decrease in security following initialization.

Thus, a central problem in secure computing, as illustrated in FIG. 2, is the problem of reliably detecting insecure or partially secure states of a computer system at various points in time and preventing security-assuming operations from being carried out in insecure states, or, to be more exact, in states less secure than the security level assumed by a program for carrying out the operations. The problem is not trivial. In general, once any non-trusted software is executed, it is difficult for subsequent processes to determine the security state of a computer system without relying on some independent, trusted processing entity that can monitor the security state of the computer system. FIGS. 3 and 4 illustrate one technique for monitoring the security state of the computer system currently promulgated by the trusted computing organization. As shown in FIG. 3, a trusted processing component provided by the Trusted Computing Platform Alliance ("TCPA"), called the trusted platform module ("TPM") 302, is added to the computer system. The TPM is an independent security-state monitor that provides, among other things, a simple interface to allow software processes to securely encrypt and decrypt data without risk of exposing encryption keys to malicious processes.

FIG. 4 illustrates the basic interface provided by a TPM. As shown in FIG. 4, the TPM 302 includes a processor 402, internal memory that stores security-state information representing the security state of the computer system 404, and internal memory 406 that stores private encryption keys used by the TPM to support the interface provided by the TPM to external processes. That interface includes three basic operations, illustrated in FIG. 4. First, an external process may transmit a current-state request 408 to the TPM and receive a response that includes an encapsulation of the current security state of the computer system 410. An external process may transmit a seal request 412, containing data that the external process wishes to protect 414, to the TPM which encrypts the data and returns to the external process a response 416 that includes the encrypted data 418. An external process may transmit an unseal request 420, containing encrypted data 424 previously encrypted by the TPM, to the TPM and receive a response 426 that includes the corresponding decrypted, or plain-text data 428. Thus, the TPM serves as a trusted data security device and security-state monitoring device. The TPM constantly monitors the state of the computer system by receiving metrics from components of the computer system and determining a current security state of the computer system by processing received metrics. Various types of metrics may be employed, including the contents of system memory, various hardware registers, and other components of the current, dynamic state of the computer system.

While the TPM can monitor the security state of a computer system, and report the current security state, the TPM provides for essentially $2^{160}$ possible security states, and even slight changes to the computational state of the computer system may lead to the TPM assigning a new security state to the computer system, depending, of course, on whether any of the slight changes impact the values of the metrics employed by the TPM to compute the current security state. Each time the security state changes, it may be difficult or impossible for secure data associated with a previous, more secure state to ever again be accessed. The TPM device is complex and adds expense to computer systems, and there are currently no provisions in the TPM standard for directly exporting security-state signals to other hardware components of a secure computer system, such as the system firmware refresh circuitry.

For all of these reasons, designers, manufacturers, and users of secure computer systems have recognized the need for a relatively simple, inexpensive, but reliable and computationally secure hardware entity and associated methodology for sensing the current security state of a computer system and preventing programs and routines executing on the computer system from carrying out operations incompatible with the current security state.

SUMMARY OF THE INVENTION

In one embodiment of the present invention, a security-state-based data vault ("SSDV") is introduced into a computer system to store the security state of the computer system and to store and make selectively available, for processes executing within a computer system, security-state-associated data. The SSDV includes two control registers, a current-security-state control register ("CSS") and a current-data-bank control register ("CDB"). The CSS is a READ/WRITE register that acts like an electronic ratchet. The CSS displays the current security state of the computer system. The CDB register controls access to a bank of data registers via a data-register window ("DRW") which may, in certain embodiments, be implemented as a bank of hardware registers that may, in turn, be backed up by flash read-only memory ("ROM") or encrypted files managed by a secure software component in order for data stored in the data banks to survive power-off and reset events.

DETAILED DESCRIPTION OF THE INVENTION

Figure 1:
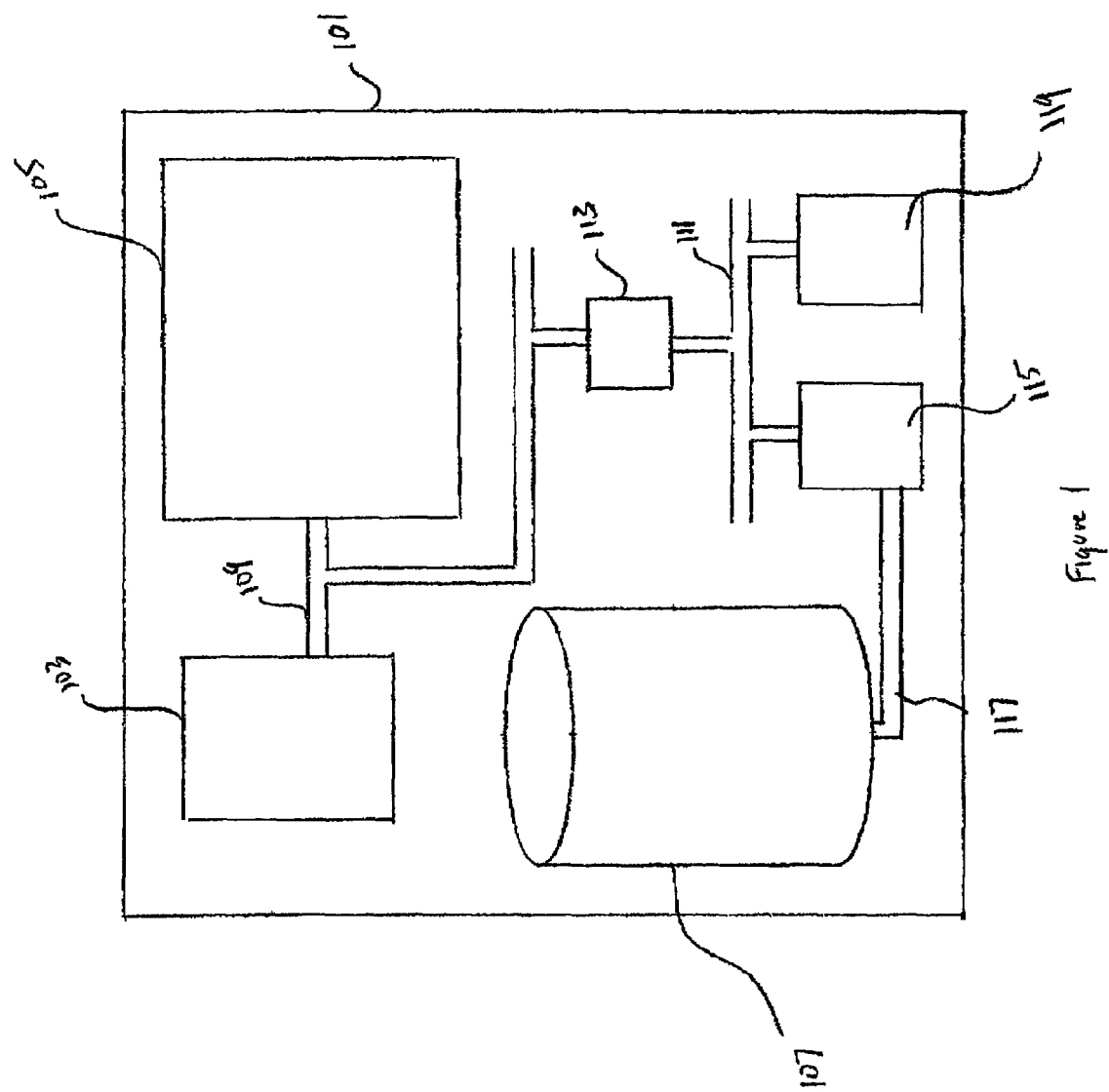
FIG. 1 is a block diagram of a number of important components within a single-processor computer-hardware platform.
Figure 2:
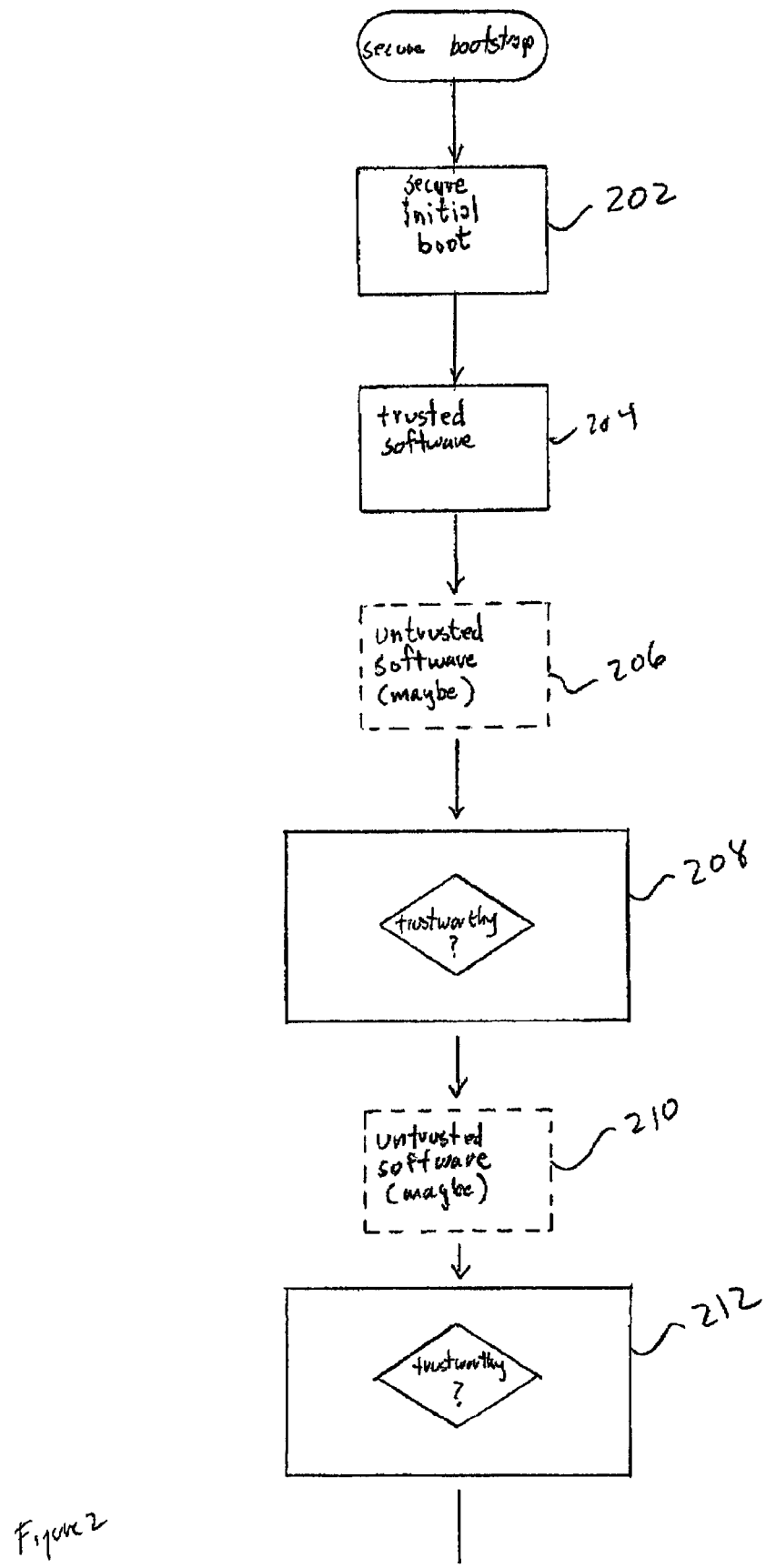
FIG. 2 is a flow-control diagram that illustrates a fundamental problem in secure computing.
Figure 3:
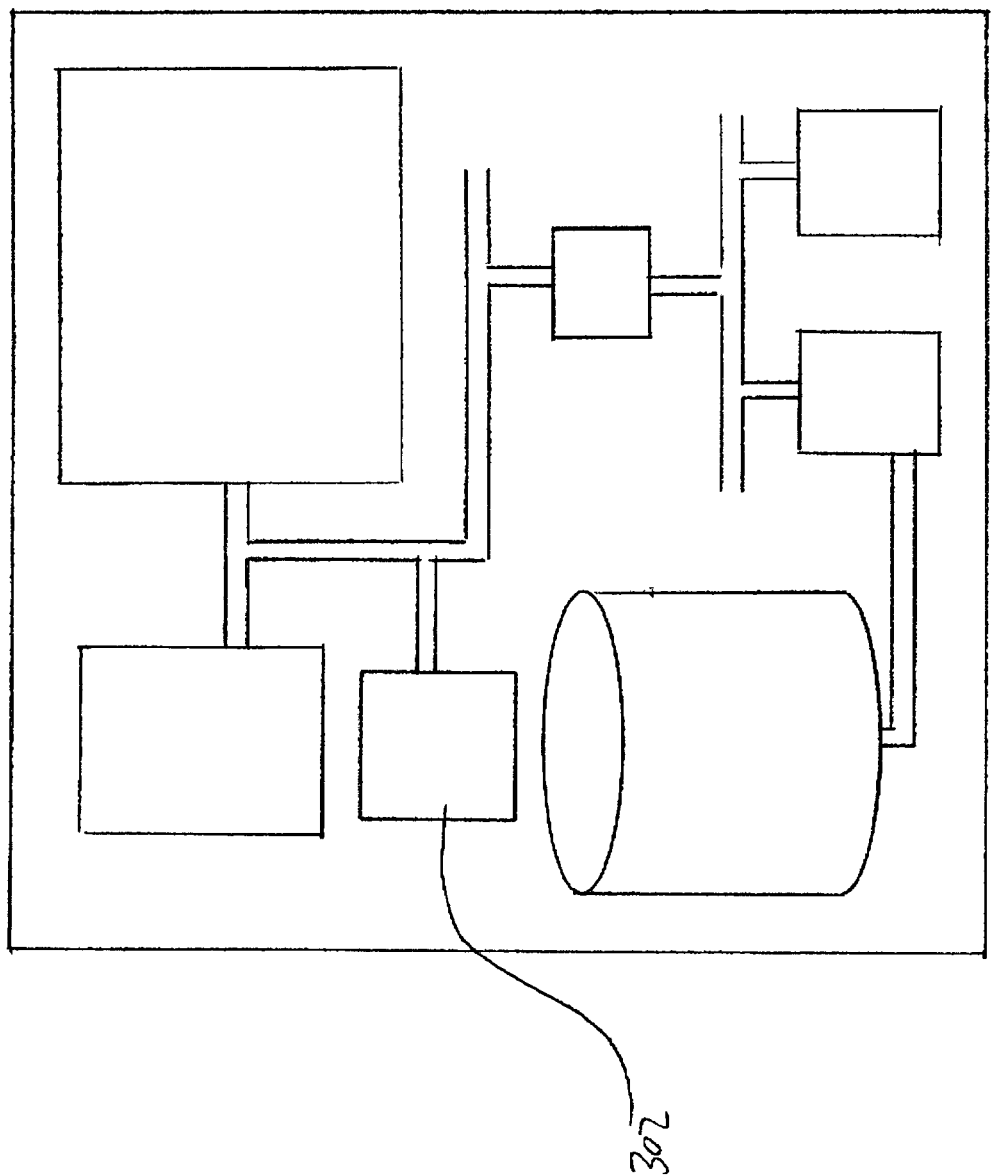
FIGS. 3 and 4 illustrate one technique for monitoring the security state of the computer system currently promulgated by the Trusted Computing Platform Alliance.
Figure 4:
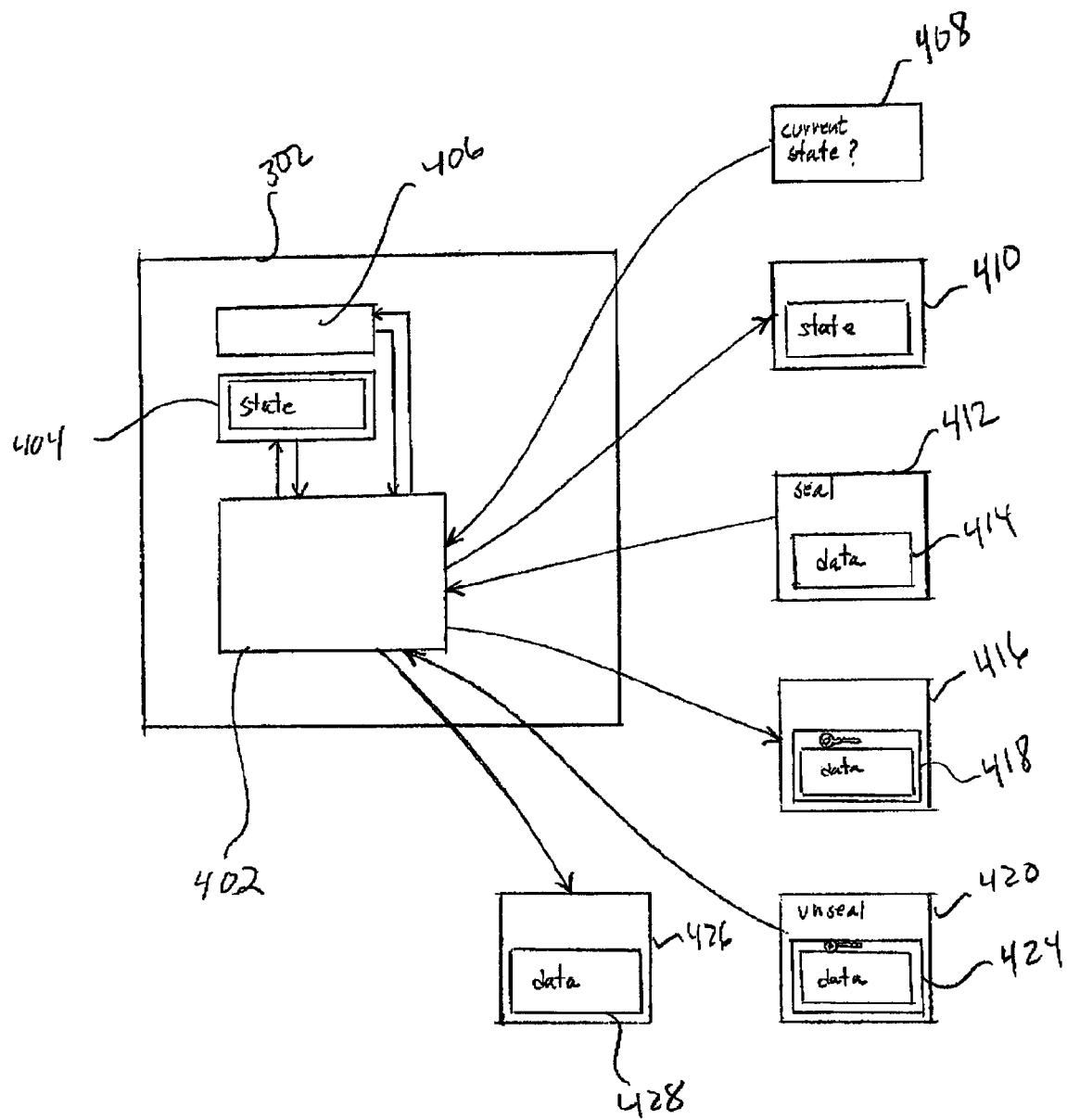

In one embodiment of the present invention, a new hardware element, a security-state-based data vault ("SSDV"), is introduced into the computer system, and interconnected via a bus or other communications medium and optionally via additional control signal lines, to securely store the current security state of the computer system and to store and provide access to data associated with specific security states. The new hardware element, called a security-state-based data vault ("SSDV"), in one embodiment provides to executing processes an ability to store the current security state of the computer system and to avoid exposing or using secured data at incompatible security levels. An executing process can then prevent itself from launching sensitive applications or exposing sensitive data within the computer system, depending on whether or not the computer system is currently in a security state compatible with the sensitive applications or data exposure.

The SSDV includes two control registers, a current-security-state control register ("CSS") and a current-data-bank control register ("CDB"). The CSS is a READ/WRITE register that acts like an electronic ratchet. The CSS displays the current security state of the computer system as an unsigned integer. The value "0" represents the highest security state, with increasing integer values representing decreasing levels of security. Upon a reset of the computer system, the current computer-system security state is "0," and can be subsequently lowered by writing a larger value into the CSS. The security state cannot, however, be raised by writing a lower value into the CSS.

In one embodiment, the CDB register controls access to a bank of data registers via a data-register window ("DRW") which may, in certain embodiments, be implemented as a bank of hardware registers that may, in turn, be backed up by flash read-only memory ("ROM") or encrypted files managed by a secure software component in order for data stored in the data banks to survive power-off and reset events. An unsigned integer written to the CDB selects the data-bank registers associated with the security state represented by that unsigned integer as the data-bank registers that can be accessed through the DRW. Only data-bank registers associated with the current security state of the computer system, or data-bank registers associated with less secure security states, may be read or written through the DRW.

The combination of the CSS-reported security state and data banks with accessibility dependent on the CSS-reported security state provides a mechanism by which a security-dependent process, currently running at a particular, needed security state can protect itself from later executing operations or exposing secret information to other processes, external monitors, or internal monitors executing at less-secure states than the particular, needed security state. The security-dependent process can store secret information, such as a decryption key, in a known data register accessible only through the DRW at the particular, needed security level or at a higher security level. The security-dependent process can then undertake other tasks, or call other routines, which may result in a security-state change. Later, after resuming execution, the security-dependent process can read the CSS to determine whether the known data register can be accessed from the current security state, and, if so, can write the particular, needed security state to the CDB in order to set the DRW to read the known data register and to thereby retrieve the previously stored decryption key. The process can then attempt to decrypt encrypted data, or decrypt an encrypted routine, using the retrieved decryption key. If the current state of the computer system is at least that reported to be currently displayed by the CSS, and no other process running at a security level equal to or greater than the particular, needed security level has subsequently overwritten the stored decryption key, the process can continue, using the decrypted data or calling the decrypted routine. If the retrieved decryption key has been altered or is being falsely or maliciously reported, for example by a less-secure process attempting to exploit the ability of the security-dependent process to access secure information, then the security-dependent process generally fails, either by attempting to use the unsuccessfully decrypted data or by invoking an unsuccessfully decrypted routine. Whether or not the process fails, the secure data or secure routine cannot be accessed and exposed by less-secure processes or monitors.

Figure 5:
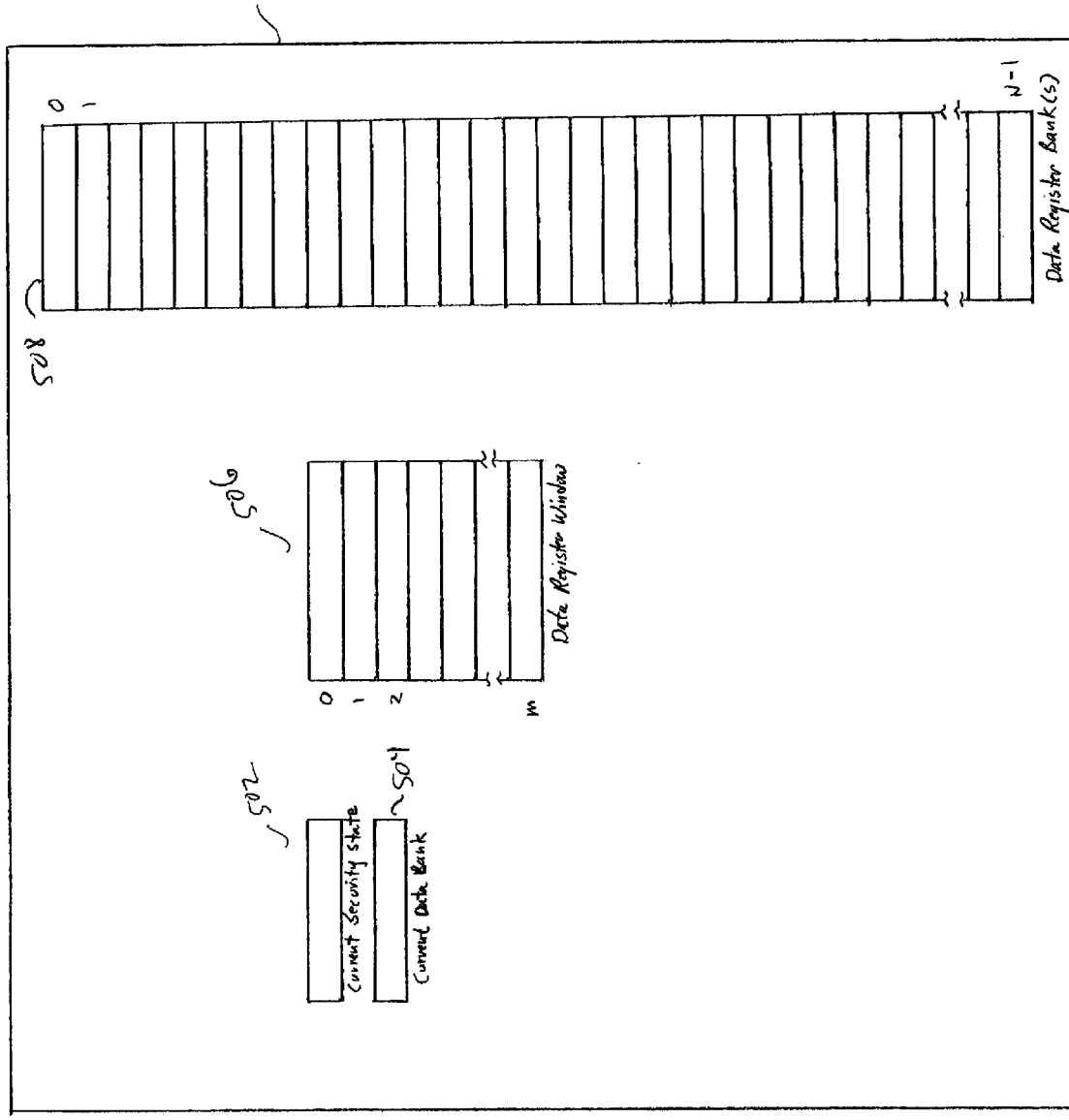
FIG. 5 illustrates components of the security-state-based data vault ("SSDV") visible at the interface level that represents one embodiment of the present invention.

FIG. 5 illustrates components of the SSDV visible at the interface level. The SSDV provides two READ/WRITE control registers: (1) the current-security-state control register ("CSS") 502 which contains an unsigned integer that represents the current security-state of the computer system, with security state 0 representing the highest possible security state and unsigned integers of increasing magnitude representing increasingly less secure security states; and (2) the current-data-bank control register ("CDB") 504, which selects a particular set of data-register-bank registers that can be accessed through a data register window. The SSDV provides a data register window 506 comprising successively addressed computer words that may be accessed similar to READ/WRITE registers. The CSS 502, CDB 504, and data register window ("DRW") 506 together compose the interface for storing and accessing security state and security-state-associated data via the SSDV. The SSDV further includes one or more data register banks 508 in which all data stored by the SSDV is securely stored. The data register window 506 can be thought of as a small aperture that can be moved over the one or more data register banks 508 to allow access to a number of data-register-bank registers equal to the number of registers that together compose the DRW. For example, in FIG. 5, the data register bank is shown to store n computer words, while the DRW provides access to m computer words, or registers, where m is less than n. The position of the aperture represented by the DRW is controlled by the contents of the CDB 504. When the CDB contains the value "0," the DRW aperture is positioned over the data register bank so that data words associated with the highest security state is visible through the DRW registers.

In various embodiments, the data banks may be implemented as hardware registers, optionally backed up to flash ROM or encrypted disk files. In other embodiments, the data banks may be implemented as I/O registers shared by one or more I/O devices, with reads and writes through the data-bank registers passed through to the sharing I/O devices. Alternatively, the data banks may be implemented using protected memory. Many other physical implementations are possible. In this discussion, the data banks are referred to as "data-bank registers," but the physical implementation may vary, as discussed above.

The CSS 502 functions as an electronic ratchet. The SSDV 500 is directly connected to the reset signal line within the computer system, so that when the computer system is reset, the SSDV is simultaneously reset to contain the value "0" in the CSS, representing the highest security state of the computer system. Thus, the security state of the computer system can never be any greater than the security state following a reset. At any point in time, an executing process may write an unsigned integer greater than the unsigned integer currently stored in the CSS in order to decrease the reported security state of the computer system. However, the reported security state of the computer system, stored in the CSS 502, can never be raised by an executing process. The current state of the computer system thus may advance from the most secure state "0" to increasingly less secure states, represented by unsigned integers of increasing magnitude.

The CDB essentially sets the position of the aperture represented by the DRW 506 within the data register bank 508. For example, when a process writes the unsigned integer 3 into the CDB, assuming that the CSS contains a value less than or equal to 3, then the SSDV arranges for the DRW 506 to make accessible that portion of the data register banks associated with the security state "3." The contents of the CDB, or, in other words, the security state corresponding to the data visible through the DRW 506, can never be lower than the current security state of the computer system contained in, and reported by, the CSS 502. When the current security state is altered by a WRITE operation directed to the CSS and when the CDB, following the WRITE operation, contains a value less than the value reported by the CSS, the CDB is automatically changed to have the same value as the CSS and the DRW registers are automatically set to allow access to the data registers associated with the new, lower security state. A particular embodiment of the SSDV may use a fixed size DRW and a fixed number of data register banks of fixed sizes, therefore allowing a particular, finite number of security states that may be associated with data and that can be reported to executing processes via the CSS. In a simple embodiment, each data bank may consist of a single register large enough to store a reasonably secure encryption key, and the DRW selects a particular register for each different, allowed security-level-representing integer written to the DRW. In more complex embodiments, the size of the DRW and the data register banks may be configurable, with the data register banks supported by external system memory accessible only to the SSDV and perhaps to a secure kernel. As discussed below, the DRW 506 may be mapped not only to an internal data register bank or external memory, but also to various control registers and other system resources in order to provide security-state-based control of those resources. For example, the DRW may control access to relatively large chunks of physical memory accessed via a system bus, each associated with a different, allowed security state. When access is attempted to chunks of physical memory associated with security states higher than the current security state, or, in other words, associated with security states represented by smaller integers than the integer representing the current security state of the computer system, then a system bus error is returned.

Figure 6A:
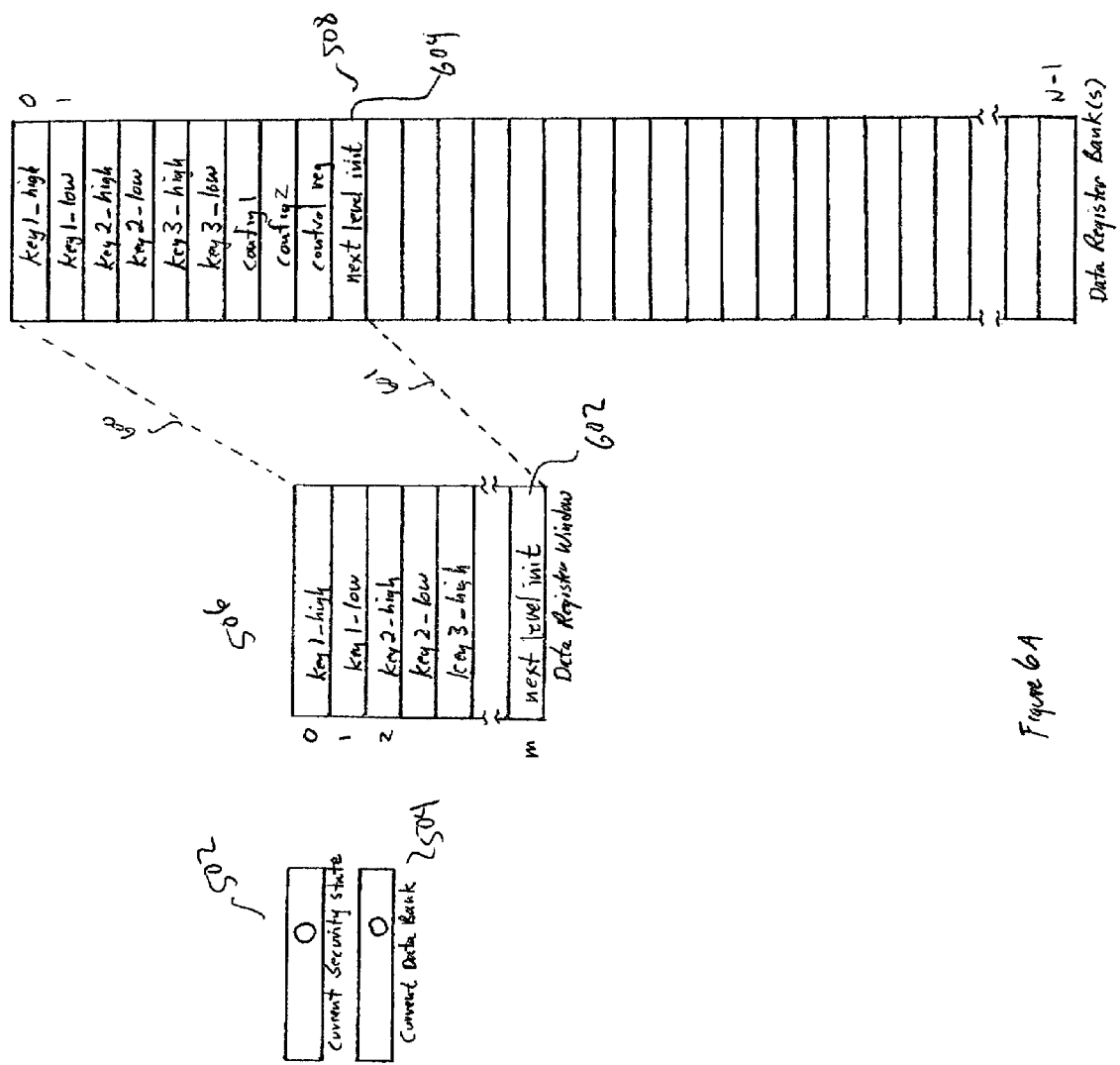
FIGS. 6A-E illustrate operation of one embodiment of the present invention, the SSDV, through the SSDV interface comprising the current-security-state control register, the current-data-bank control register, and the data-register window.

FIGS. 6A-E illustrate operation of the SSDV through the SSDV interface comprising the CSS, CDB, and DRW. All five figures employ the illustration conventions employed in FIG. 5, and use, where appropriate, numerical labels used in FIG. 5. In FIG. 6A, the contents of the data register bank 508, DRW 506, and control registers CSS 502 and CDB 504 are shown following a reset of the computer system and initial execution of a most highly privileged, secure boot strap or secure kernel program. The current security state of the computer system is "0," as reported by the CSS 502. The DRW 506 is currently positioned to allow access to data stored in the data register banks associated with security state "0," as currently contained in the CDB 504. The DRW 506 is shown, in FIG. 6A, to contain, or provide access to, data values contained in the lowest addressed data registers of the data register banks 508, as indicated by dashed lines 600 and 601. In the embodiment illustrated in FIGS. 6A-E, the first portion of the data registers visible through the DRW can be viewed only at the current security state of the computer system or at higher security states represented by security-state values of lower magnitude. However, the final data register 602 visible through the DRW 506 is a data-register-bank register 604 associated with the next lowest security state. In other words, in the described embodiment, the DRW may overlap, and allow access to, the data registers associated with the next lowest security state. This may allow, in the case shown in FIG. 6A, a secure bootstrap or secure kernel to initialize data accessible by processes executing at the next lowest security state of the computer system. Alternatively, the secure bootstrap or secure kernel can manipulate the CDB to position the DRW arbitrarily within the data register banks in order to write data that may be accessed by processes executing when the security state of the computer system is lower than the highest security state at which the secure bootstrap or secure kernel executes. In other embodiments, the DRW may exactly match those data registers accessible at the current security state, and, in still other embodiments, the DRW may be smaller than the total number of data registers accessible at a given security state, and may be moved within the data registers accessible at a current security state by an additional control register.

Figure 6B:
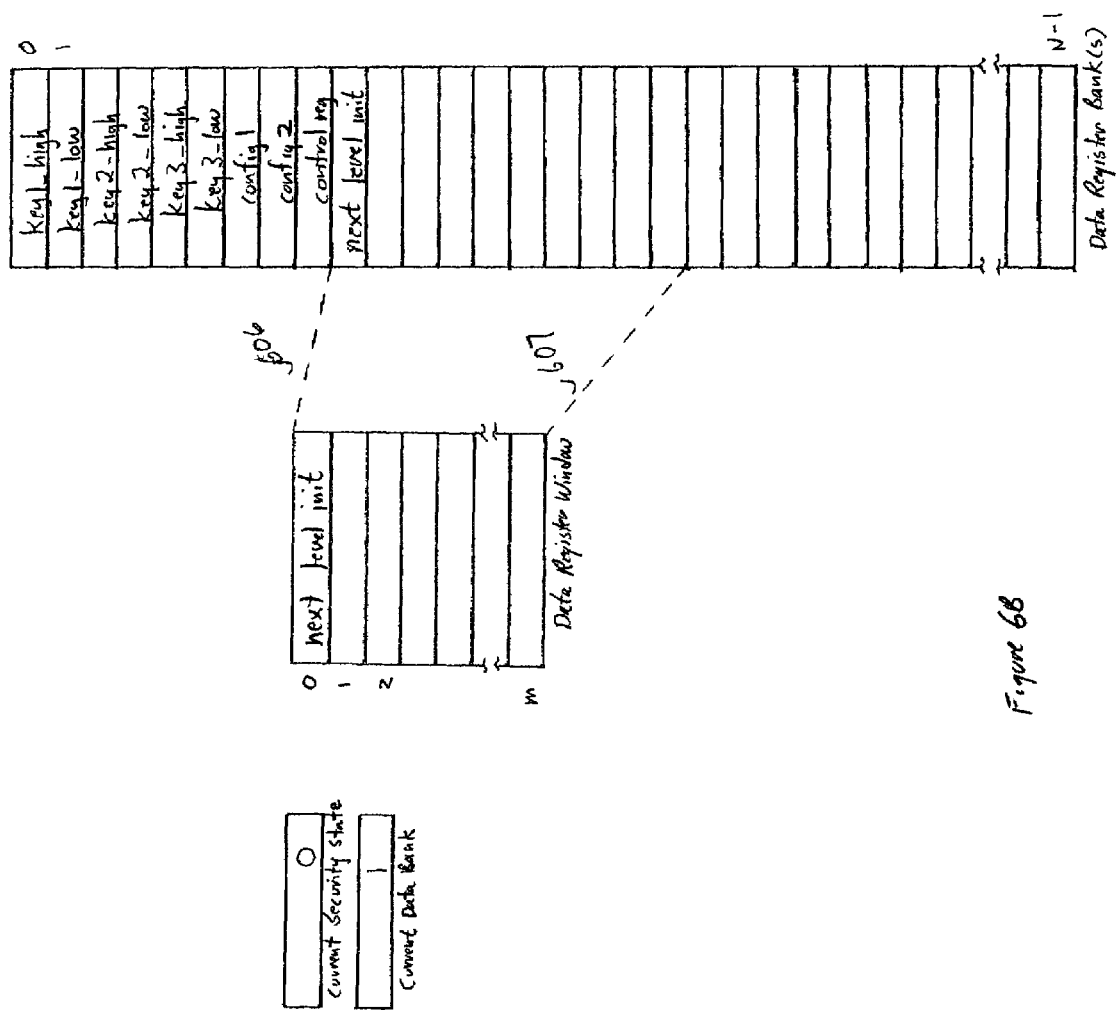

As discussed above, the secure bootstrap or secure kernel may write an unsigned integer representing a lower security state into the CDB in order to reposition the DRW over data registers associated with a lower security state. For example, as shown in FIG. 6B, when the secure bootstrap or secure kernel writes the value "1" in the CDB, the DRW is repositioned as indicated by dotted lines 606-607. Again, however, a value lower than the value currently contained in the CSS, when written to the CDB, is ignored, or possibly logged as an error, by the SSDV. The contents of the CDB, which control positioning of the DRW within the data register banks, may only be equal to, or greater in magnitude than, the value currently stored in the CSS.

Figure 6C:
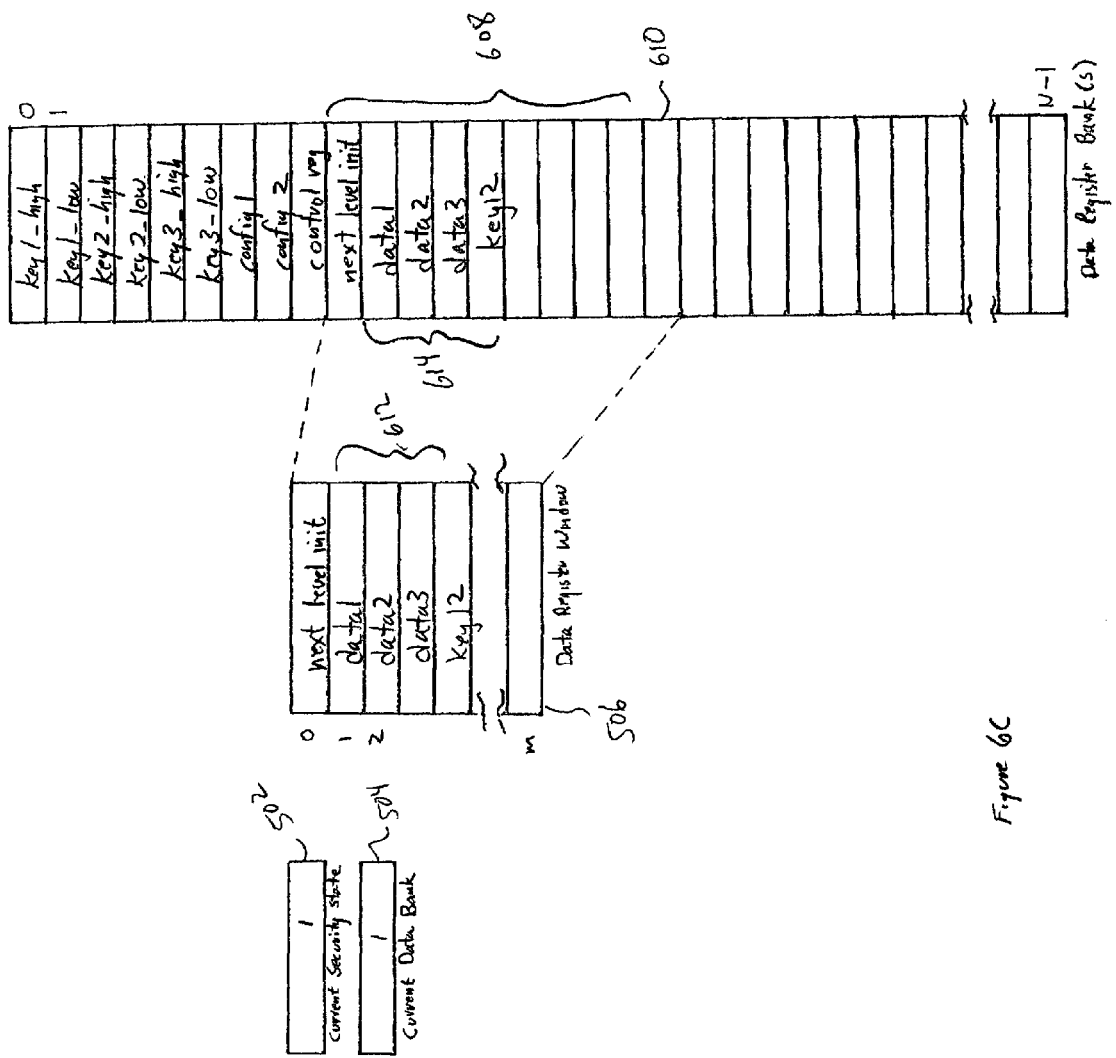

When the secure bootstrap or secure kernel program reaches a point where another program needs to be called, the secure bootstrap or secure kernel needs to lower the currently reported security state prior to calling the program to reflect the security level that the secure bootstrap or secure kernel attributes to the program to be called by writing the new security state into the CSS. FIG. 6C illustrates the SSDV interface following update by the secure bootstrap or secure kernel of the current security state of the computer system via the CSS. Note, in FIG. 6C, that the contents of the CDB 504 are automatically updated to reflect the new value of the CSS 502. Note also that the DRW 506 now allows access to the data words 608 of the data-register bank associated with security state "1," as well as an additional data register 610 associated with security state "2." Again, as described above, in alternate embodiments, the DRW allows access only to exactly those data registers 608 associated with the current security state "1." Note also that the called program, currently executing at the reported security state "1," has written data to registers 1-4 612 of the DRW 506, resulting in writing of the data values to the corresponding data-register-bank registers 614.

Note that, in certain embodiments, particular security states may represent security-state dead-ends, essentially freezing the security state from subsequent changes unless the computer system undergoes a hard reset. Thus, for example, a secure boot program may set particular security levels for particular operating systems, with the DRW implementation constrained to allow access only to those data registers associated with the current security state. Thus, there could be a particular security state assigned to each of a number of different operating system, and the operating systems protected from accessing each other's private, operating-system-specific information via encryption keys or other such secret information stored in data registers accessible only through the DRW.

Figure 6D:
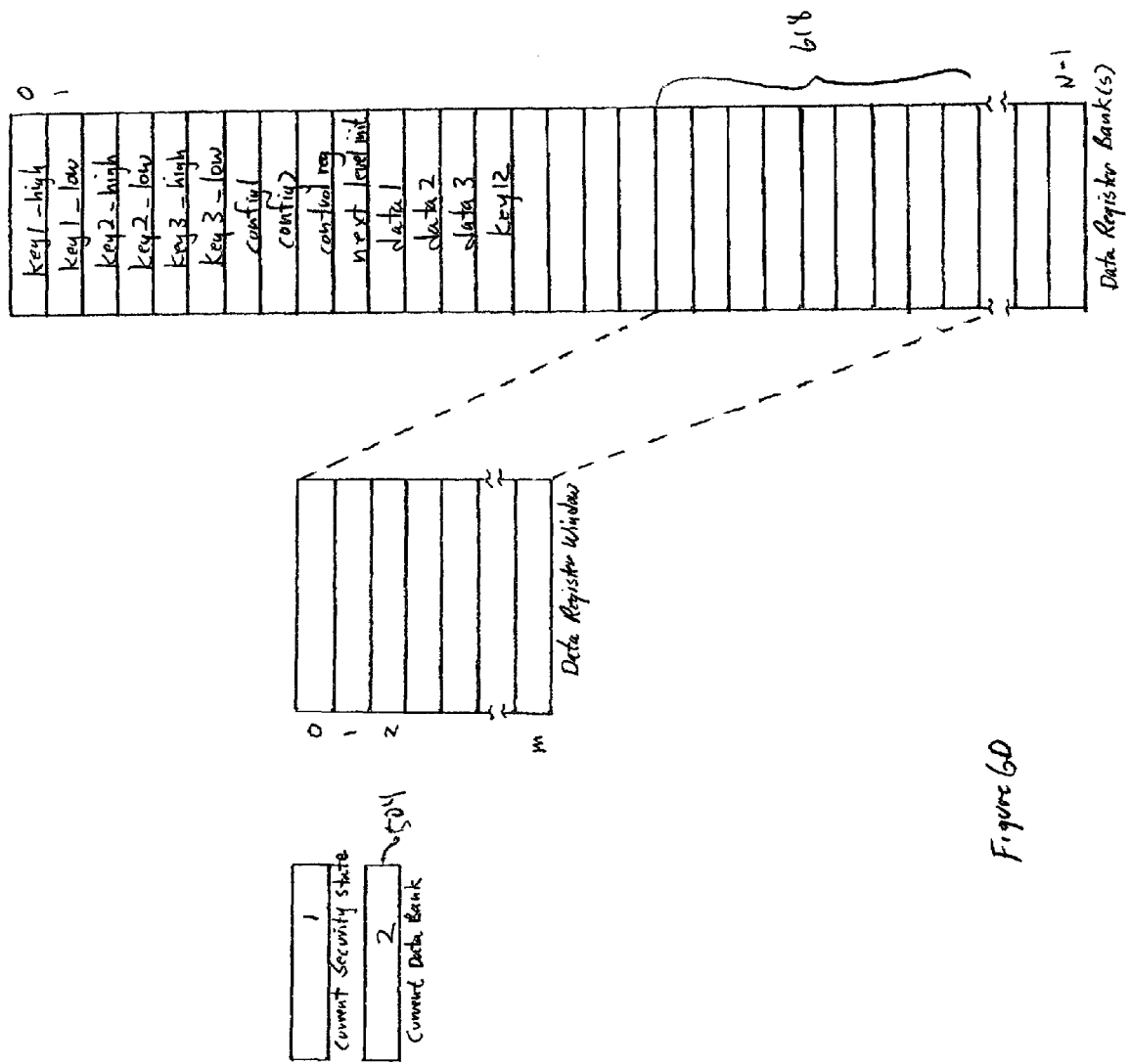
Figure 6E:
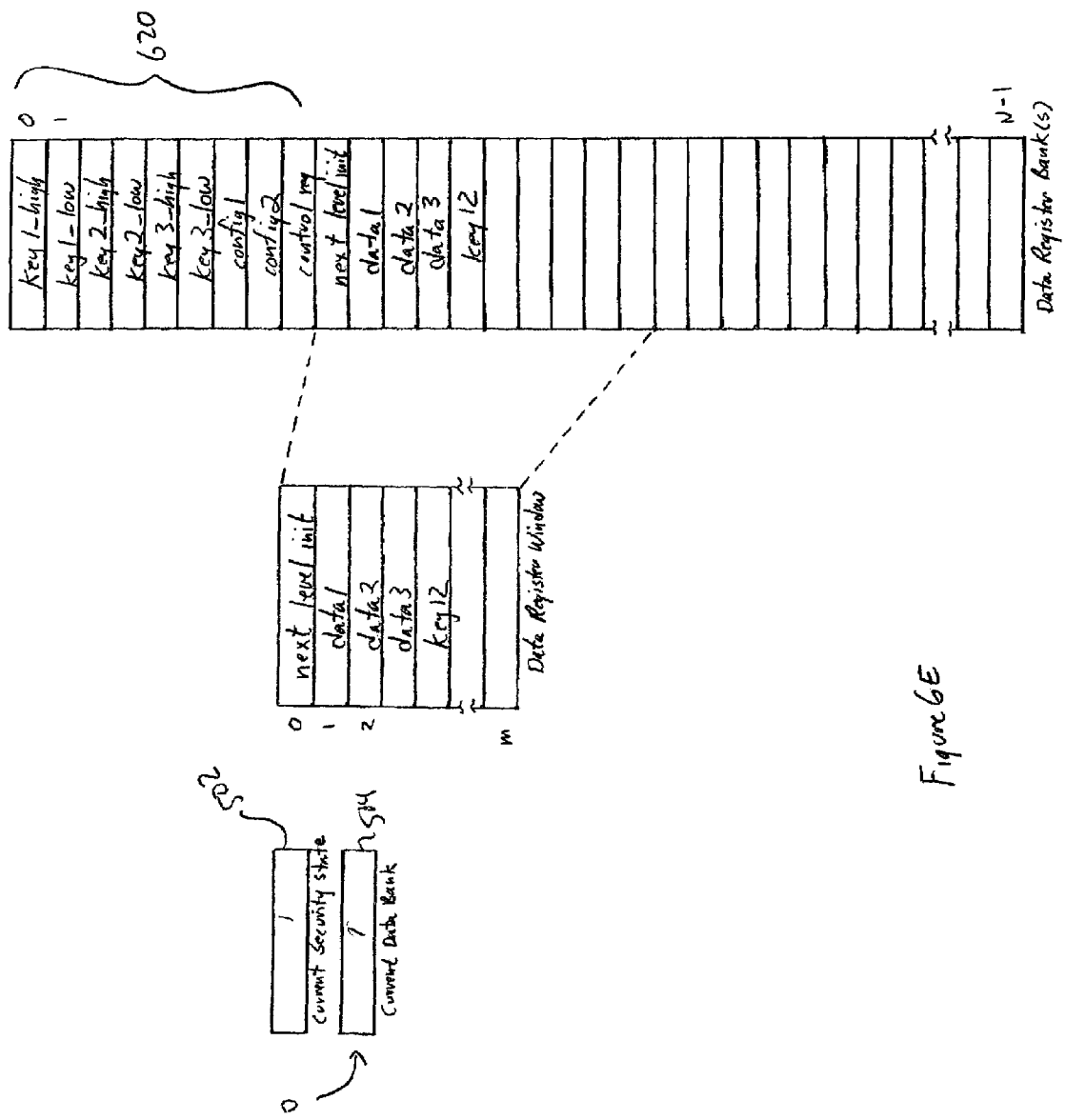

As shown in FIG. 6D, the program called by the secure bootstrap or secure kernel may access data-register-bank registers 616 associated with the next lowest security state "2" by writing the value "2" into the CDB 504. However, as shown in FIG. 6E, when a process or program executing at a current reported security state of "1" attempts to write the value "0" in the CDB 504, the CDB is decreased only to the value currently contained in the CSS 502. Thus, a process executing at a point in time when the current reported security state is "1" can never access the data-register-bank registers 620 associated with the security state 0. In an alternative embodiment, an attempt to write a value in to the CDB lower than the value currently reported by the CSS may be simply ignored.

Figure 7:
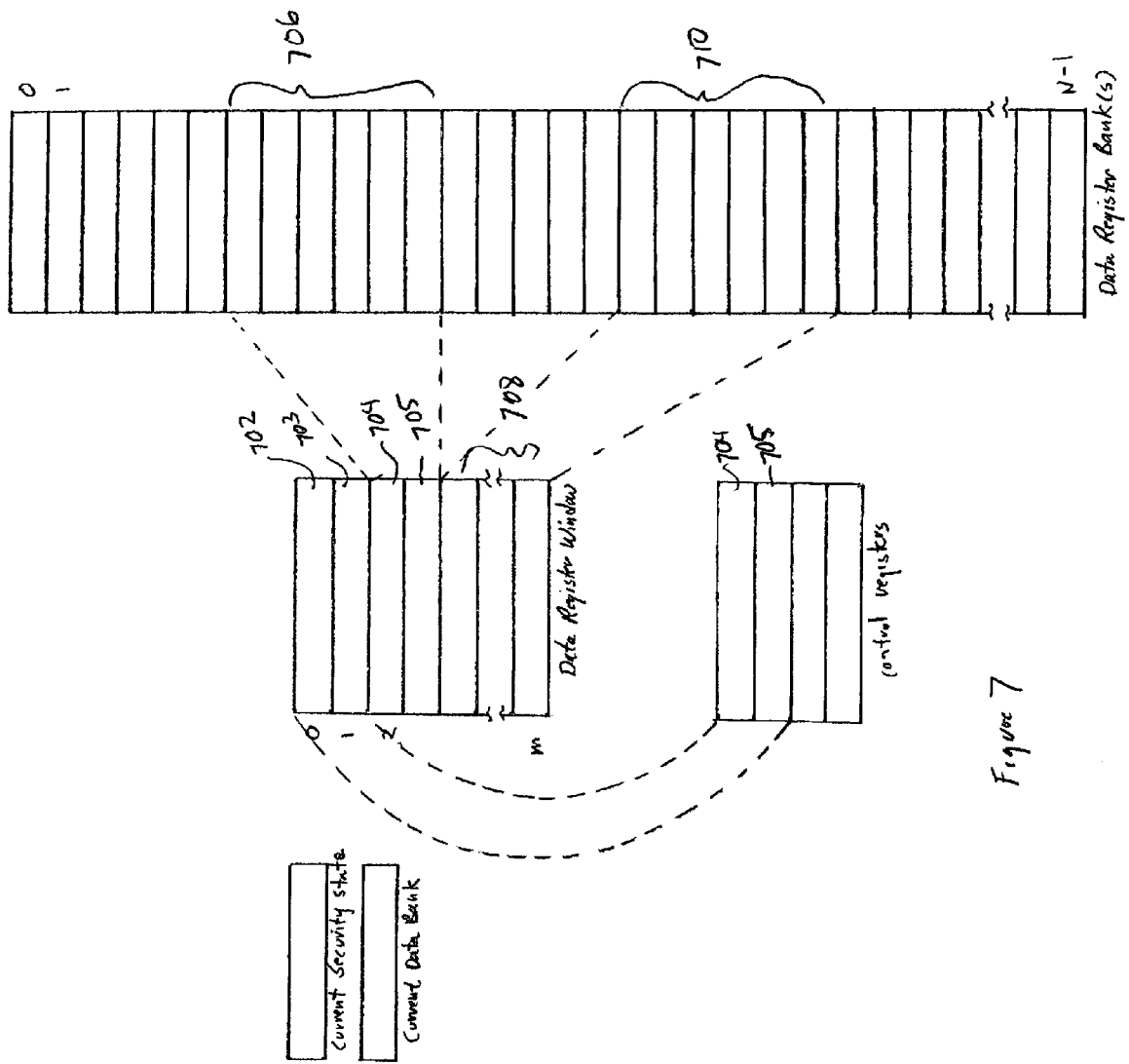
FIG. 7 illustrates an alternative mapping of data-register window registers in an alternative embodiment of the present invention.

As noted above, the SSDV may map DRW registers not only to internal data-register-bank data registers, but also to external memory and to external registers. These mappings may be configurable, and configured upon power-up or re-initialization of the SSDV via a computer system reset, or may be fixed in firmware or hardware. FIG. 7 illustrates an alternative mapping of DRW registers. As shown in FIG. 7, the first two DRW registers 702-703 are mapped to two control registers 704-705. These control registers may be accessed by the SSDV via a system bus or point-to-point serial or parallel connections. The next two DRW registers 704-705 are mapped to a particular block of data-register-bank data registers 706. The final set of DRW registers 708 is mapped to a different block of data-register-bank registers 710 that are not contiguous to the data-register-bank data registers 706 to which DRW registers 704 and 705 are mapped. FIG. 7 illustrates that DRW register mappings may be arbitrary, and may include mappings to external memories, control registers, and other system resources. In most embodiments, the DRW is simply a view, providing access to a defined set of data registers, and not itself storing data. However, in some embodiments, the contents of the DRW may mirror underlying data registers, with WRITE operations directed to a DRW register changing both the contents of the DRW register as well as the state of the underlying data-storage element to which the DRW register is mapped, and with READ operations needing only to return the contents of a DRW register.

Figure 8:
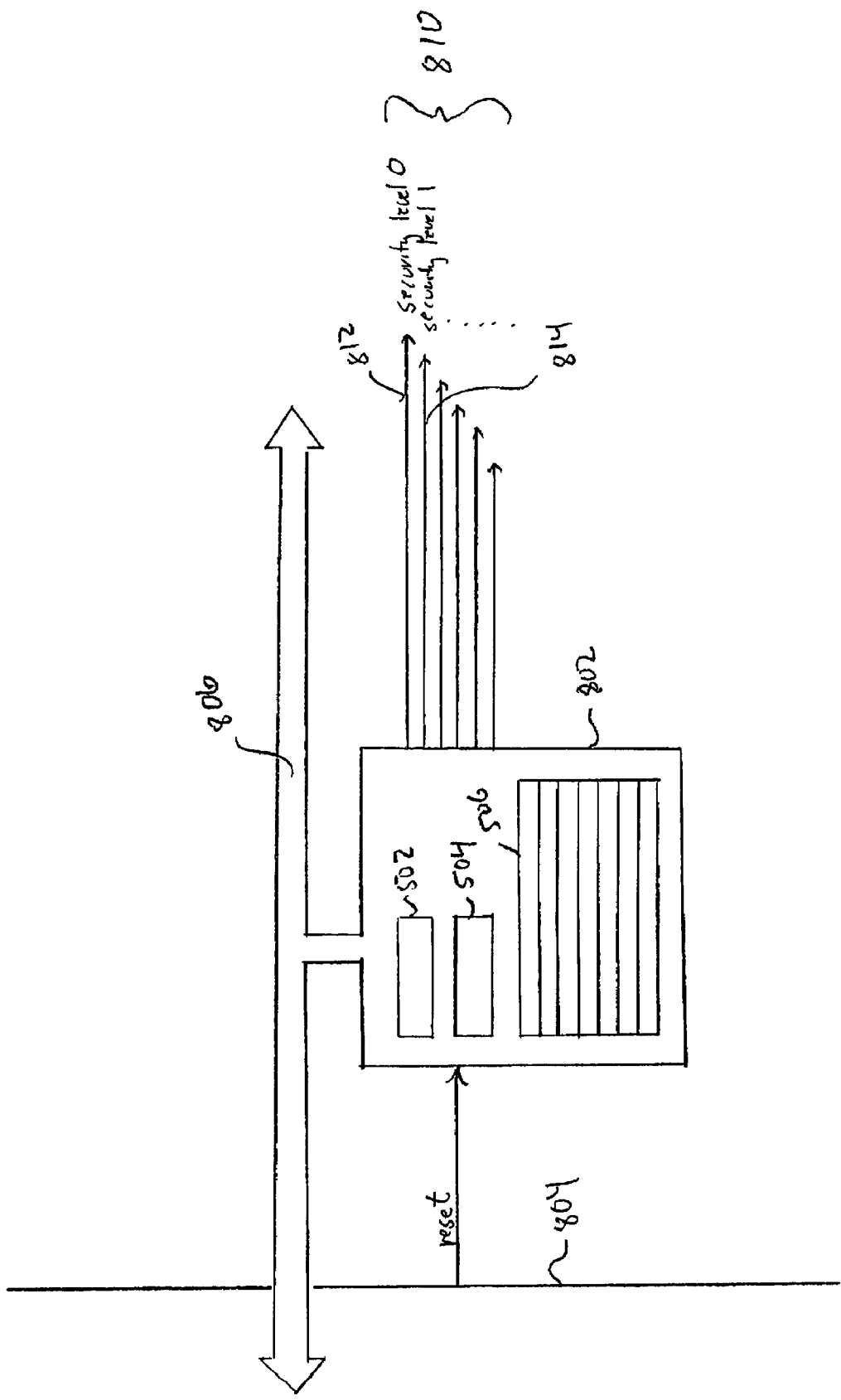
FIG. 8 illustrates the integration of an SSDV representing one embodiment of the present invention within a computer system.

FIG. 8 illustrates the integration of the SSDV within a computer system. As shown in FIG. 8, the SSDV 802 provides the CSS 502 and CDB 504 control registers, along with the DRW 506, as a direct or indirect interface to processes. In certain systems, programs may directly access the CSS and CDB, and, in other systems, may access these registers through an operating system interface. The SSDV is directly connected to the computer system reset signal line 804 so that, when the computer system is reset, the SSDV is simultaneously reset, in particular including resetting the CSS to report a current security state of "0" and resetting the CDB to position the DRW to allow access to data-register-bank registers associated with the security state "0." In many embodiments, access to the CSS 502, CDB 504, and DRW 506 is provided to the processor and other processing components of a computer system by a bus 806. In addition, the SSDV may export various signals via discrete signal lines. For example, in the embodiment shown in FIG. 8, the SSDV outputs n distinct signal lines 810, each output signal line corresponding to a particular security level. Thus, when the CSS 502 currently displays the security state to be "0," then the output signal line 812 corresponding to security level "0" is raised, while the remaining output signal lines, beginning with signal line 814, are low. When the SSDV is currently reporting, via the CSS, a security state of "1," then output signal line 814 is raised, and the remaining output signal lines are low. These signal lines may, in turn, be input into various components of the computer system to control operation or access to these components based on the reported security state of the computer system. An example of the need for this is to prevent firmware reflash in any security state but the most secure. Thus, the code that runs at reset, when the device goes back to a most secure state, can only ever be changed under that code's own control. In alternative embodiments, a bus may be used, rather than individual signal lines, with an integer representing the security state multiplexed onto, and transmitted by, the bus. An exponentially greater number of security states can then be encoded on a fixed number of signal lines.

The SSDV provides sufficient hardware support for unambiguous sensing of the current security state of a computer system, providing that, prior to calling the routine or program of a lower security, the calling program adjusts the currently reported security state of the computer system by writing the lower security value to the CSS of the SSDV, and provided that any program relies on the CSS-reported security state by retrieving secret information from a data-bank register associated with the currently reported security state in a way that cannot be distinguished by the actual, current security level. In other words, a program must rely on secret data in a way that does not expose secret data. If a program were to explicitly branch, depending on whether or not a correct secret data was retrieved from a DRW register, with the correct value located in a constant within the program, then the branch point could be monitored by a malicious agent, and the secret data recovered from the program code or from a register. Instead, the program needs to execute in the same way regardless whether or not secret data is correctly recovered, and fail if it has not, or continue if it has, without exposing the secret data.

As in all computer systems, an interface to the SSDV is most likely provided by an operating system, and the operating system interface may be captured and fraudulently simulated by a malicious program. However, if each program establishes and employs a rather simple security protocol, the functionality provided by the SSDV is sufficient to detect such highjackings of operating system interfaces and any other software-based threat to the computer system. As one example, a program may choose to store a cryptographic key in a particular data-register-bank data register accessible to the process at the security state at which the process system tended to run. At any subsequent point in time, the process may write the desired security state to the CDB in order to access that stored cryptographic key. Using the cryptographic key retrieved from the SSDV, the process may then verify a digital signature included in the image of a program prior to running that program. If the digital signature verifies, then the process can be sure that the current security state of the computer system is that desired by the process prior to launching the program. In this manner, the process can ensure that the program is not launched in a less secure environment than that in which it is intended to run. While a malicious process may highjack the operating system interface, and the malicious process may simulate the SSDV and report a current security state higher than the security state contained in the CSS control register of the SSDV, the malicious process has no way of decreasing the currently reported security state in order to provide access, to the calling process, to the stored cryptographic key associated with a desired security state higher than that of the malicious process. Many other similar cryptography-based protocols and techniques may be employed to guarantee that only those programs intended to run at particular security levels have access to secret information needed by the programs to run at that security level.

The signals output by the SSDV, such as signals 810 shown in FIG. 8, may be used to control access to, or operation of, other system resources. For example, the signal line representing security level "0" may be input to logic controlling system firmware reflash. The controlling logic may only allow the system firmware to be reflashed in the case that the reported security state of the computer system by the SSDV is security state "0." As another example, a particular host-to-PCI bridge may be disabled unless the signal line 812 corresponding to security level "0" is raised, thus preventing access to various devices interconnected by the host-to-PCI bridge through any and all processes executing at points in time at which the reported security state of the computer system by the SSDV is less than security state "0." As mentioned above, the DRW may be mapped not only to internal data register banks within the SSDV, but also to external control registers and memories. Thus, certain control registers that control initialization and operation of various devices or interconnects may be accessible only to processes running at a point in time when the reported security state of the computer system is security state "0," or some other particular security state. This technique may shield control of various internal components from access or control by any processes or routines other than a secure bootstrap or secure kernel.

The described embodiment provides simple READ/WRITE access to the DRW registers, and through them, to the data register banks. However, many system busses provide additional access attributes, and these additional access attributes may be supported by the SSDV and forwarded through the DRW to control access of the data-register-bank data registers.

Although the present invention has been described in terms of a particular embodiment, it is not intended that the invention be limited to this embodiment. Modifications within the spirit of the invention will be apparent to those skilled in the art. For example, the SSDV may be implemented in an almost limitless number of different ways, including straight hardware circuitry implementations, firmware based implementations, dedicated-processor-based implementations, combined software and hardware implementations, and combinations of these and other types of implementations. As discussed above, many implementations of the SSDV support two control registers and a data register window interface, but additional control registers and additional DRWs or other data accessing interfaces may also be incorporated within an SSDV. An SSDV may also support only a CSS, with the positioning of the DRW controlled directly by the CSS. While many computer systems most easily incorporate an SSDV via a bus, direct interconnection to a controller or processor may also be employed.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A secure, computer-security-state-storing component and secure data repository comprising:
   a current-security-state register;
   a data-register window; and
   a data-register bank accessed through registers of the data-register window, the data-register window positioned to allow access to only those data-register-bank registers associated with a security state equal to, or lower than a security state currently reported by the current-security-state register.

2. The secure, computer-security-state-storing component and secure data repository of claim 1 wherein the current-security-state register reports, upon READ access by a process, a current security state of a computer system.

3. The secure, computer-security-state-storing component and secure data repository of claim 2 wherein a process may direct a WRITE operation to the current-security-state register to lower the current security state of the computer system.

4. The secure, computer-security-state-storing component and secure data repository of claim 1 wherein the current-security-state register reports a current security state of the computer system comprising an unsigned integer representing the current security state.

5. The secure, computer-security-state-storing component and secure data repository of claim 1 further including a current-data-bank register to which a WRITE operation may be directed by a process to write a representation of a security state to the current-data-bank register in order to select those data-register-bank registers associated with the security state for access through the data-register window.

6. The secure, computer-security-state-storing component and secure data repository of claim 5 wherein the current-data-bank register can select for access through the data-register window only data-register-bank registers associated with security states equal in security to, or less secure than, the security state currently reported by the current-security-state register.

7. The secure, computer-security-state-storing component and secure data repository of claim 5 wherein, when a representation of a security state more secure than the security state currently reported by the current-security-state register is written to the current-data-bank register, the writing of the representation of the security state has no effect on the data-register-bank registers accessible through the data-register window.

8. The secure, computer-security-state-storing component and secure data repository of claim 7 wherein, when a representation of a security state more secure than the security state currently reported by the current-security-state register is written to the current-data-bank register, the secure, computer-security-state-storing component writes an entry to an error log.

9. The secure, computer-security-state-storing component and secure data repository of claim 5 wherein, when a representation of a security state more secure than the security state currently reported by the current-security-state register is written to the current-data-bank register, the data-register-bank registers associated with the security state currently reported by the current-security-state register are made accessible through the data-register window.

10. The secure, computer-security-state-storing component and secure data repository of claim 1 wherein, when a representation of a security state more secure than the security state currently reported by the current-security-state register is written to the current-security-state register, the writing of the representation of the security state is ignored, and has no effect on the security state reported by the current-security-state register.

11. The secure, computer-security-state-storing component and secure data repository of claim 1 wherein current-security-state register is physically connected to one or more system components to enable and disable the one or more system components in accordance with the current security state of a system in which the secure, computer-security-state-storing component and secure data repository is included.

12. The secure, computer-security-state-storing component and secure data repository of claim 1 wherein the data-register-bank registers are implemented by one or a combination of:
- internal, physical data-register-bank data registers;
- system memory;
- a peripheral memory device;
- a mass-storage device;
- general, registers, and
- external memory.

13. The secure, computer-security-state-storing component and secure data repository of claim 12 wherein the data-register-bank registers are mapped to one or more of internal data-register-bank data registers, external memory, and external registers, and wherein the mapping may be configurable.

14. A method for securing a computer system, the method comprising:
- including in the computer system a secure, computer-security-state-storing component and secure data repository comprising a current-security-state register, a data-register window, and a data-register bank accessed through registers of the data-register window, the data-register window positioned to allow access to only those data-register-bank registers associated with a security state equal to, or lower than, the security state currently reported by the current-security-state register;
- before a process or routine executing in the computer system launches another process or routine, writing a security state associated with the other process or routine to be launched into the current-security-state register of the secure, computer-security-state-storing component and secure data repository.

15. The method of claim 14 further including storing in one or more data-register-bank registers secret data by a process that, when subsequently retrieved, is relied upon by the process to prevent the process from carrying out operations needing a particular security state or a security state equally or more secure than a threshold security state when the computer system is currently at an incompatible security state.

16. The method of claim 15 wherein the secret data is an encryption key.

17. Computer instructions that carry out the method of claim 14 for securing a computer system stored in a computer readable medium.

18. A secure computer system secured by the method of claim 14.

19. A secure, computer-security-state-storing component and secure data repository comprising:
- a means for reporting a current security state;
- a means for storing and retrieving data associated with particular security states; and
- a means for controlling the means for storing and retrieving data associated with particular security states to allow access to only that stored data associated with a security state equal to, or lower than, a security state currently reported by the current-security-state-reporting means.

* * * * *

UNITED STATES PATENT AND TRADEMARK OFFICE
CERTIFICATE OF CORRECTION

PATENT NO. : 7,398,390 B2 Page 1 of 1
APPLICATION NO. : 10/638007
DATED : July 8, 2008
INVENTOR(S) : Chris D. Hyser It is certified that error appears in the above-identified patent and that said Letters Patent is hereby corrected as shown below:

In column 12, line 1, in Claim 1, after "than" insert -- , --.

In column 13, line 12, in Claim 12, after "general" delete ",".

Signed and Sealed this

Second Day of December, 2008

JON W. DUDAS
*Director of the United States Patent and Trademark Office*